United States Patent
Montes

(10) Patent No.: US 8,131,318 B2
(45) Date of Patent: Mar. 6, 2012

(54) RADIO COMMUNICATION DEVICE COMPRISING AT LEAST ONE RADIO COMMUNICATION MODULE AND ONE SIM CARD, CORRESPONDING RADIO COMMUNICATION MODULE AND SIM CARD

(75) Inventor: Jacques Montes, Le-Perreux-sur-Marne (FR)

(73) Assignee: Wavecom, Issy-les-Moulineaux (FR)

( * ) Notice: Subject to any disclaimer, the term of this patent is extended or adjusted under 35 U.S.C. 154(b) by 848 days.

(21) Appl. No.: 12/089,767

(22) PCT Filed: Oct. 10, 2006

(86) PCT No.: PCT/FR2006/002289
§ 371 (c)(1),
(2), (4) Date: Sep. 9, 2008

(87) PCT Pub. No.: WO2007/042672
PCT Pub. Date: Apr. 19, 2007

(65) Prior Publication Data
US 2009/0156254 A1    Jun. 18, 2009

(30) Foreign Application Priority Data
Oct. 10, 2005 (FR) ...................................... 05 10340

(51) Int. Cl.
*H04M 1/00* (2006.01)
(52) U.S. Cl. .......................... 455/558; 455/420; 455/411
(58) Field of Classification Search .................. 455/558, 455/410, 411, 418–420, 557, 550.1, 575.1, 455/90.3
See application file for complete search history.

(56) References Cited

U.S. PATENT DOCUMENTS

| | | | | |
|---|---|---|---|---|
| 5,418,837 | A  * | 5/1995 | Johansson et al. | 455/558 |
| 5,875,404 | A  * | 2/1999 | Messiet | 455/558 |
| 6,480,725 | B2 * | 11/2002 | Cassidy et al. | 455/558 |
| 7,593,723 | B2 * | 9/2009 | Zarom | 455/420 |
| 7,747,997 | B1 * | 6/2010 | Rao | 717/170 |
| 7,966,039 | B2 * | 6/2011 | Sadovsky et al. | 455/557 |
| 2003/0199289 | A1 * | 10/2003 | Kao et al. | 455/575.1 |
| 2003/0200445 | A1 * | 10/2003 | Park | 713/185 |
| 2003/0224768 | A1 * | 12/2003 | Adjamah | 455/418 |
| 2004/0023689 | A1 * | 2/2004 | Ahonen | 455/558 |
| 2006/0183500 | A1 * | 8/2006 | Choi | 455/558 |
| 2008/0161049 | A1 * | 7/2008 | Lagnado et al. | 455/558 |
| 2009/0007275 | A1 * | 1/2009 | Gehrmann | 726/27 |
| 2011/0131421 | A1 * | 6/2011 | Jogand-Coulomb et al. | 713/189 |

FOREIGN PATENT DOCUMENTS

| | | |
|---|---|---|
| DE | 100 04 164 | 8/2001 |
| DE | 10004164 A1 | 8/2001 |
| FR | 2 843 513 | 2/2004 |

(Continued)

OTHER PUBLICATIONS

International Preliminary Report on Patentability from counterpart foreign Application No. PCT/FR2006/002289.

(Continued)

*Primary Examiner* — Sharad Rampuria
(74) *Attorney, Agent, or Firm* — David D. Brush; Westman, Champlin & Kelly, P.A.

(57) ABSTRACT

A radio communication device includes at least one radio communication module including baseband and/or radio frequency signal processing. The module of the device carries an internal SIM card, permanently welded thereto.

21 Claims, 1 Drawing Sheet

FOREIGN PATENT DOCUMENTS

| WO | WO 95/12293 | 5/1995 |
| WO | WO 99/55105 | 10/1999 |
| WO | WO 01/76309 | 10/2001 |
| WO | WO 02/080586 | 10/2002 |
| WO | WO 03/077585 | 9/2003 |

OTHER PUBLICATIONS

International Search Report from counterpart foreign Application No. PCT/FR2006/002289.

* cited by examiner

RADIO COMMUNICATION DEVICE COMPRISING AT LEAST ONE RADIO COMMUNICATION MODULE AND ONE SIM CARD, CORRESPONDING RADIO COMMUNICATION MODULE AND SIM CARD

CROSS-REFERENCE TO RELATED APPLICATIONS

This Application is a Section 371 National Stage Application of International Application No. PCT/FR2006/002289, filed Oct. 10, 2006 and published as WO 2007/042672A1 on Apr. 19, 2007, not in English.

FIELD OF THE DISCLOSURE

The field of the disclosure is that of radio communications using terminals comprising SIM cards (SIM or "Subscriber Identity Module").

The disclosure applies in particular to exchanges with terminals associated with remote equipment for measuring, detecting, processing, etc. (also known as "Machine To Machine" or "M2M" communications).

M2M communications are used for example to monitor remote machines, for example gas meters, gas or fluid leak detectors, water level detectors, automatic cash dispensers or other machines.

The disclosure also applies to the use of radio communication means in vehicles, and more generally to all types of terminal.

The disclosure also applies in the field of mobile telephony (or "handset" field), particularly in the case where a user wishes to change operator.

The disclosure also applies to short-range wireless communications (or "Wireless Local Loop") such as those used by office telephones operating on the GSM or GPRS networks.

BACKGROUND OF THE DISCLOSURE

Conventionally, a SIM card is an external and removable element in relation to the communication terminal with which it is associated. This is because its aim is to identify a "subscriber" who may decide to change terminal without wishing to change his identifier associated with the SIM card. The latter is therefore arranged in a housing provided in the communication device.

The SIM card can be physically changed during the life of the communication device, for example in order to obtain more functionalities or to change operator.

FIG. 1 shows an example of a conventional SIM card. The chip 10 of the SIM card 1 is arranged on a plastic substrate 11.

During the production of SIM cards, in a phase known as SIM card personalization, the manufacturer places in the SIM card a number of functions requested by the operator and also stores parameters of the operator (for example secret keys, encryption algorithms, etc.).

In the context of M2M applications, the communication modules are often:
- hidden within more complex items of equipment (mention may be made for example of the case of the modules hidden within a motor vehicle or a machine);
- hidden and difficult to access (mention may be made of the case of water meters in remote geographical areas);
- exposed to hostile environments, in particular in terms of temperature, humidity or vibrations.

Thus, regardless of whether in the field of "handset" communications or in the field of M2M communications, SIM cards are a weak link in the communication device particularly due to the fact that the environmental constraints generally cannot be withstood by the standard packagings of SIM cards. In any case, the quality of the installation and connections is below that of all the other components of the terminal.

Furthermore, SIM cards require that the housing intended to receive them is accessible. This necessary accessibility may substantially complicate the manufacture of the communication device and therefore may make it more expensive.

In addition, the use of this housing causes a certain bulk and increases the amount of time taken to develop the applications installed on the device, in particular due to the fact that some of the signals from the module must be routed towards the SIM card.

SUMMARY

An aspect of the disclosure is directed to a radio communication device comprising baseband and/or radio frequency signal processing means mounted on a support.

According to an embodiment of the invention, such a radio communication device carries an internal subscriber identification SIM card which is definitively secured to the support.

An embodiment of the invention is thus based on a completely novel and inventive approach to using a SIM card in a radio communication device by integrating the SIM card directly on a printed circuit board (PCB) and/or in a communication module of the device.

The text below will refer to an internal SIM card as opposed to the conventional external SIM card.

Consequently, since the SIM card is integrated in a fixed manner in the communication terminal, it benefits from the same protection as the other components with regard to electrostatic discharges and environmental constraints (in particular temperature, vibrations and humidity).

Furthermore, the SIM card no longer has to be accessible.

In addition, the fact of using a SIM card which is integrated in the module makes it possible to reduce the size of the communication device.

This also makes it possible to reduce the time taken to develop the application(s) of the device, since it is not necessary to route signals towards an external SIM card.

In fact, a complete communication assembly is obtained (with the SIM card included) which has known and mastered environmental characteristics.

On the other hand, particularly in the context of "handset" applications, by blocking the integrated SIM card via the communication network in which the radio communication device is used, it is possible to render unusable the device or a communication module of the device. It is therefore possible to prevent any attempt at fraudulent use of the device or of a communication module of the device, in particular with another SIM card.

Furthermore, since the integrated SIM card cannot be removed from the radio communication device, it cannot be used with another radio communication device.

Advantageously, the communication device comprises at least one radio communication module comprising said baseband and/or radio frequency signal processing means and said internal SIM card.

Preferably, the internal SIM card is secured to the module by welding.

According to one advantageous feature of an embodiment of the invention, the internal SIM card carries information items for parameterizing and/or identifying the module.

Preferably, the parameterization information items comprise data for configuring the radio frequency means.

Advantageously, the identification information items comprise a first key intended to be combined with a second key present in the signal processing means, so as to allow operation of the device only after checking that the first and second keys match.

According to one advantageous feature of an embodiment of the invention, the radio communication device comprises connection means for connecting a second subscriber identification SIM card, referred to as the external SIM card.

Preferably, the radio communication device comprises deactivation means for deactivating the internal SIM card when an external SIM card is present in the connection means.

Advantageously, the radio communication device comprises selection means for selecting one of the SIM cards.

According to one preferred feature of an embodiment of the invention, the radio communication device comprises dialogue means for dialoguing between the SIM cards.

Advantageously, the external SIM card performs operations for registering on a radio communication network, and the internal SIM card performs internal operations for parameterizing the module and/or checking a protocol stack.

Preferably, the internal SIM card stores at least one authorization parameter for the external SIM card, so as to carry out the authentication thereof.

According to one advantageous feature of an embodiment of the invention, the internal SIM card comprises means for storing a minimal protocol stack which allows a basic reboot of the module.

Thus, this protocol stack can be transferred from the internal SIM card to the baseband processing means. This protocol stack can be updated in the internal SIM card by the baseband processing means as a function of the requirements of the internal SIM card with regard to the protocol stack and also any other feature.

Preferably, the internal SIM card comprises means for detecting a software fault in the module, and means for rebooting the module.

Advantageously, the module comprises reading means for reading from the internal SIM card an information item indicating that it is said internal SIM card that has forced a reboot, and means for transmitting the information item to a remote server.

According to a first advantageous embodiment of the invention, the internal SIM card is installed in a casing equipped with pins allowing it to be welded to a module.

According to a second advantageous embodiment of the invention, the internal SIM card is definitively secured directly to a printed circuit of the module.

According to one advantageous feature of an embodiment of the invention, the internal SIM card comprises:
  means for receiving at least one information item for configuring the internal SIM card;
  means for switching from a first configuration to a second configuration of the internal SIM card which takes account of this at least one configuration information item; and
  means for informing the baseband signal processing means of a switch from the first configuration to the second configuration.

Preferably, the baseband signal processing means comprise:
  means for detecting at least one unsuitability of the second configuration for at least one use of the radio communication device after the means for switching from the first configuration to the second configuration have been activated; and
  means for asking the internal SIM card to adopt the first configuration.

Advantageously, the first and second configurations are adapted respectively to a first and a second communication network.

An embodiment of the invention also relates to a radio communication module for a radio communication device as described above.

An embodiment of the invention also relates to an internal SIM card for a radio communication device as described above.

BRIEF DESCRIPTION OF THE DRAWINGS

Other features and advantages will become more clearly apparent on reading the following description of two preferred embodiments, given purely by way of non-limiting example, and the appended drawings, in which.

DETAILED DESCRIPTION OF ILLUSTRATIVE EMBODIMENTS

Figure 1:
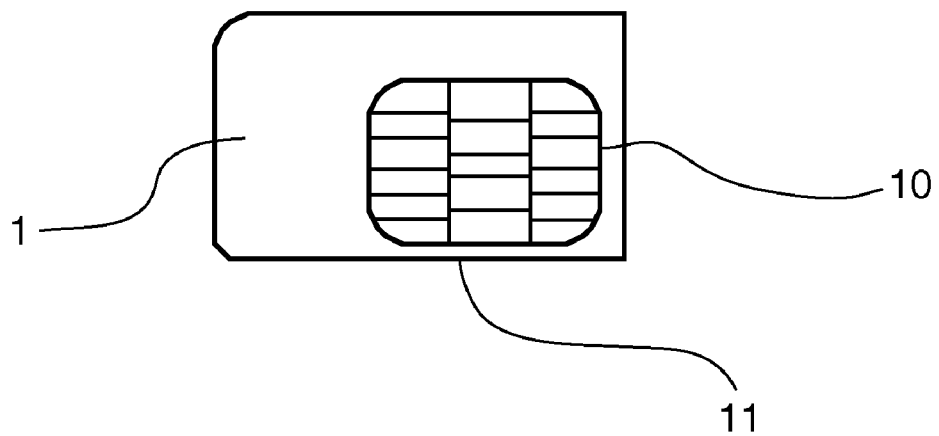
FIG. 1 shows an example of a conventional SIM card.
Figure 2:
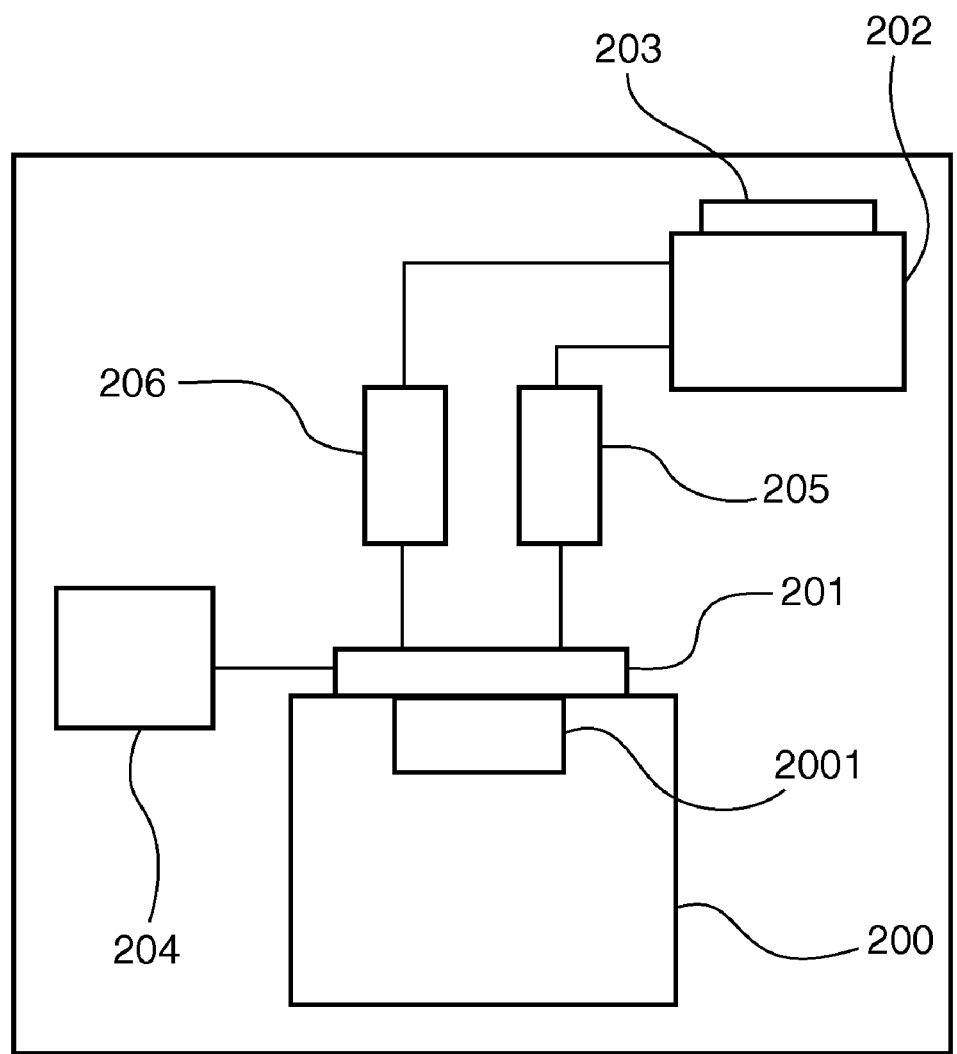
FIG. 2 shows a radio communication device according to a first embodiment of the invention, in which use is made of both an internal SIM card and an external SIM card such as that shown in FIG. 1.

FIG. 2 shows an example of a radio communication device 20 (for example a remote gas meter) according to a first embodiment of the invention, in which use is made both of an internal SIM card and an external SIM card.

The radio communication device comprises a radio communication module 200 which itself comprises baseband and radio frequency signal processing means.

A first SIM card 201, referred to as the internal SIM card 201, is installed in a casing (not shown) equipped with pins which is welded to the module 200.

It is possible to use for example a standard casing for installing the internal SIM card.

According to one variant (not shown) of this embodiment, the internal SIM card 201 is welded directly to a printed circuit of the module 200.

This internal SIM card 201 carries information items for parameterizing and information items for identifying the module 200.

The parameterization information items comprise for example data for configuring the radio frequency processing means (for example keys, radio frequency authentication data, etc.).

The identification information items comprise a first key (consisting for example of IMSI and ICCID identifiers) intended to be combined with a second key (consisting for example of an IMEI identifier) present in the signal processing means, so as to allow operation of the device only after checking that the first and second keys match.

It will be recalled that:
  the ICCID identifier ("Integrated Circuit Card ID") is a number which physically identifies the internal SIM card 201;
  the IMEI identifier ("International Mobile Equipment Identity") constitutes the identity of the communication module 200, this IMEI identifier being independent of the internal SIM card 201;

the IMSI identifier ("International Mobile Subscriber Identity") makes it possible to identify in a communication network a subscriber to this network in order for example to be able to bill said subscriber.

The device 20 also comprises connection means 202 for connecting a second SIM card 203, referred to as the external SIM card 203. It also comprises deactivation means 204 for deactivating the internal SIM card 201 when the external SIM card 203 is present in the connection means 202, and selection means 205 for selecting one of the SIM cards.

This is because the module can be registered only with a single operator and with a single SIM card and therefore, generally, when the external SIM card 203 is present, the internal SIM card is deactivated by the deactivation means 204.

However, the radio communication device 20 also comprises dialogue means 206 for dialoguing between the SIM cards.

It is thus possible (by means of interfaces such as two SIM buses managed by the module, and in particular the "baseband" part) to implement a dialogue between the two SIM cards. In this case, the external SIM card 203 performs for example operations for registering on a radio communication network, and the internal SIM card performs internal operations for parameterizing the module 200 and/or checking a protocol stack.

Furthermore, the internal SIM card 201 may play a role in authenticating the external SIM card 203, by storing certain authorization parameters for the external SIM card (for example sets of allocated operators, authorized functions, etc.).

It is thus possible, in certain applications, to have a simultaneous operation of the two SIM cards.

Since the internal SIM card 201 is strongly connected physically to the module 200, it can be used as a complement to the module 200 for performing certain functions.

It is possible for example to write to or read from this internal card 201 information items for parameterizing the module (for example keys, radio frequency authentication data, etc.).

It is also possible to write to or read from memory means of the internal SIM card 201 a minimal protocol stack which makes it possible, in the event of a "crash" (or software failure) of the module 200, to establish a basic connection to a network in order to download a full protocol stack and thus to perform a basic reboot of the module 200.

This protocol stack can be transferred from the internal SIM card 201 to the baseband processing means. This protocol stack can be updated in the internal SIM card 201 by the baseband processing means as a function of the requirements of the internal SIM card 201 with regard to the protocol stack and also any other feature.

The internal SIM card 201 also makes it possible to monitor the module 200 itself. To this end, it comprises detection means (not shown) for detecting a software fault in the module 200, and means for rebooting the module 200. The module 200 comprises reading means 2001 for reading from the internal SIM card 201 an information item indicating that it is said internal SIM card that has forced a reboot, and means for transmitting this information item to a remote server (not shown).

Thus, when it detects a crash of the module 200, the internal SIM card 201 reboots the module 200 and then the latter reads from the internal SIM card 201 an information item which allows it to know whether its reboot was forced by the internal SIM card, then the module 200 notifies this to a remote server.

The internal SIM card 201 makes it possible to obtain strong identification of the constituents of the radio communication device 20 by using an identification between the internal SIM card 201 which comprises the aforementioned first key and the module 200 which comprises the aforementioned second key, by checking that the first and second keys match after they have been combined.

Thus, and in order to prevent any use of the module 200 or of the internal SIM card 201 separately from one another (for example in the case of industrial espionage), the SIM card 201 is able to operate only with the module 200 specifically intended for it, and vice versa.

In order to meet certain standards which stipulate that it has to be possible to carry out electrical and functional tests on the SIM card, a SIM interface on which a test tool can be placed is provided on the module 200.

It is therefore provided in this case to maintain an external connection to the internal SIM card 200, at least for these tests.

As has been seen above, when the external SIM card 203 is detected, the module 200 can decide to deactivate (via the deactivation means 204) the internal SIM card 201 so as to work only with the external SIM card 203. However, at least for the aforementioned tests, it is also possible to provide for manual selection of the activated SIM card via the aforementioned selection means 205.

According to a second embodiment (not shown) of the invention, no external SIM card 203 or connection means 202 for connection to such an external SIM card is used in the communication device 20.

It may be noted that, at the time of definitive placement of the operator in the internal SIM card 201, two situations may arise:
  either the operator is known during the SIM card production phase, and then the aforementioned SIM card personalization phase carried out either by the module manufacturer or by the SIM card manufacturer is sufficient;
  or the operator is not known during the SIM card production phase, and then a default operator is registered in the card. This information will subsequently make it possible to connect to the network and to change the operator in a phase referred to as "post allocation".

According to one preferred embodiment of the invention, data (or information items) for configuring the internal SIM card 201 (for example download data, generally referred to as "DataDownload") can be transmitted to suitable receiving means of the internal SIM card 201 without any intervention by the baseband processing means. These data are preferably encrypted and cannot be read.

These configuration data may comprise the IMSI of the user of the communication device 20. However, in the case where the internal SIM card 201 comprises several IMSIs, these configuration data may comprise just one information item which allows the internal SIM card 201 to ascertain which IMSI it must select.

Thus, these configuration data may be network data which allow the internal SIM card 201 (when switching from a first configuration corresponding to a first communication network to a second configuration corresponding to a second network) to change its network identity, or even to change operator.

After the SIM card has performed an internal data change, it informs the baseband signal processing means of this, indicating the files that have changed and optionally requesting a re-initialization of the internal SIM card 201 in order to carry out a reboot and thus potentially a new network registration.

If, after a change of configuration (from the first configuration to the second configuration) of the internal SIM card 201, an unsuitability of the second configuration for a use of the radio communication device 20 is detected by the baseband signal processing means, the latter have the possibility of asking the internal SIM card 201 to reconfigure according to the first configuration.

Considering the particular case where the configuration data are IMSIs, after the internal SIM card 201 has taken account of the network data corresponding to the second communication network (switch from the first configuration to the second configuration of the internal SIM card 201) and after the internal SIM card 201 has been re-initialized, the second network may not be available, which prevents any use of the radio communication device 20 for communication purposes (the second configuration is then unsuitable for use of the device 20 for communication purposes).

After the baseband signal processing means have detected (for example after a predetermined delay) that the communication device 20 is unable to communicate, they ask the internal SIM card 201 to return to the first configuration (corresponding to the first communication network), which has the effect of establishing a new connection to the first network.

Preferably, the baseband signal processing means or the internal SIM card 201 uses this connection to the first network to inform a remote server of the facts.

An embodiment of the disclosure provides a technique that uses, in a communication device, a SIM card in a way that is less sensitive to the environmental constraints.

An embodiment of the disclosure provides such a technique that does not require the SIM card to be accessible in the communication device.

Yet another embodiment provides such a technique that makes it possible to reduce the size of the device and the time taken to develop the applications implemented on the device.

Another embodiment provides such a technique that is easy and inexpensive to use.

Although the present disclosure has been described with reference to one or more examples, workers skilled in the art will recognize that changes may be made in form and detail without departing from the scope of the disclosure and/or the appended claims.

The invention claimed is:

1. Radio communication device comprising:
 a baseband and/or a radio frequency signal processing means mounted on a support,
 at least one radio communication module comprising said baseband and/or radio frequency signal processing means and an internal subscriber identification SIM card, wherein said SIM card comprises means for storing a minimal protocol stack suitable for establishing a basic connection to a communication network in order to download a full protocol stack which allows a basic reboot of said module.

2. Radio communication device according to claim 1, wherein the subscriber identification SIM card is an internal subscriber identification SIM card which is definitively secured to said support.

3. Radio communication device according to claim 2, wherein said internal SIM card is secured to said module by welding.

4. Radio communication device according to claim 2, wherein said internal SIM card carries information items for parameterizing and/or identifying said module.

5. Radio communication device according to claim 4, wherein said parameterizing information items comprise data for configuring said radio frequency processing means.

6. Radio communication device according to claim 4, wherein said identification information items comprise a first key intended to be combined with a second key comprised in said signal processing means, so as to allow operation of said device only after checking that said first and second keys match.

7. Radio communication device according to claim 2, wherein the device comprises connection means for connecting a second subscriber identification SIM card, referred to as an external SIM card.

8. Radio communication device according to claim 7, wherein the device comprises deactivation means for deactivating said internal SIM card when an external SIM card is connected to said connection means.

9. Radio communication device according to claim 8, wherein the device comprises selection means for selecting one of said SIM cards.

10. Radio communication device according to claim 7, wherein the device comprises dialogue means for dialoguing between said SIM cards.

11. Radio communication device according to claim 10, wherein said external SIM card performs operations for registering on a radio communication network, and said internal SIM card performs internal operations for parameterizing said module and/or checking a protocol stack.

12. Radio communication device according to claim 7, wherein said internal SIM card stores at least one authorization parameter for said external SIM card, so as to carry out authentication thereof.

13. Radio communication device according to claim 2, wherein said internal SIM card comprises means for detecting a software fault in said module, and means for rebooting said module.

14. Radio communication device according to claim 13, wherein said module comprises reading means for reading from said internal SIM card an information item indicating that it is said internal SIM card that has forced a reboot, and means for transmitting said information item to a remote server.

15. Radio communication device according to claim 2, wherein said internal SIM card is installed in a casing equipped with pins allowing it to be welded to a module.

16. Radio communication device according to claim 2, wherein said internal SIM card is definitively secured directly to a printed circuit of said module.

17. Radio communication device according to claim 2, wherein said internal SIM card comprises:
 means for receiving at least one information item for configuring said internal SIM card;
 means for switching from a first configuration to a second configuration of the internal SIM card which takes account of this at least one configuration information item; and
 means for informing the baseband signal processing means of a switch from the first configuration to the second configuration.

18. Radio communication device according to claim 17, wherein the baseband signal processing means comprises:
 means for detecting at least one unsuitability of said second configuration for at least one use of the radio communication device after the means for switching from the first configuration to the second configuration have been activated; and means for asking the internal SIM card to adopt the first configuration.

19. Radio communication device according to claim 17, wherein the first and second configurations are adapted respectively to a first and a second communication network.

20. Module for a radio communication device, said module comprising:
- a baseband and/or radio frequency signal processing means, and
- a subscriber identification SIM card carried by the device and comprising means for storing a minimal protocol stack suitable for establishing a basic connection to a communication network in order to download a full protocol stack which allows a basic reboot of said module.

21. SIM card for a radio communication device comprising at least one radio communication module comprising baseband and/or radio frequency signal processing means, wherein the SIM card comprises means for allowing the SIM card to be definitively welded to said module, and wherein said SIM card comprises means for storing a minimal protocol stack suitable for establishing a basic connection to a communication network in order to download a full protocol stack which allows a basic reboot of said module.

* * * * *